Feb. 18, 1930. F. F. JAMES 1,748,048
AUTOMATICALLY ADJUSTABLE DOUBLE END SHACKLE BOLT CONNECTION
Filed Oct. 30, 1928
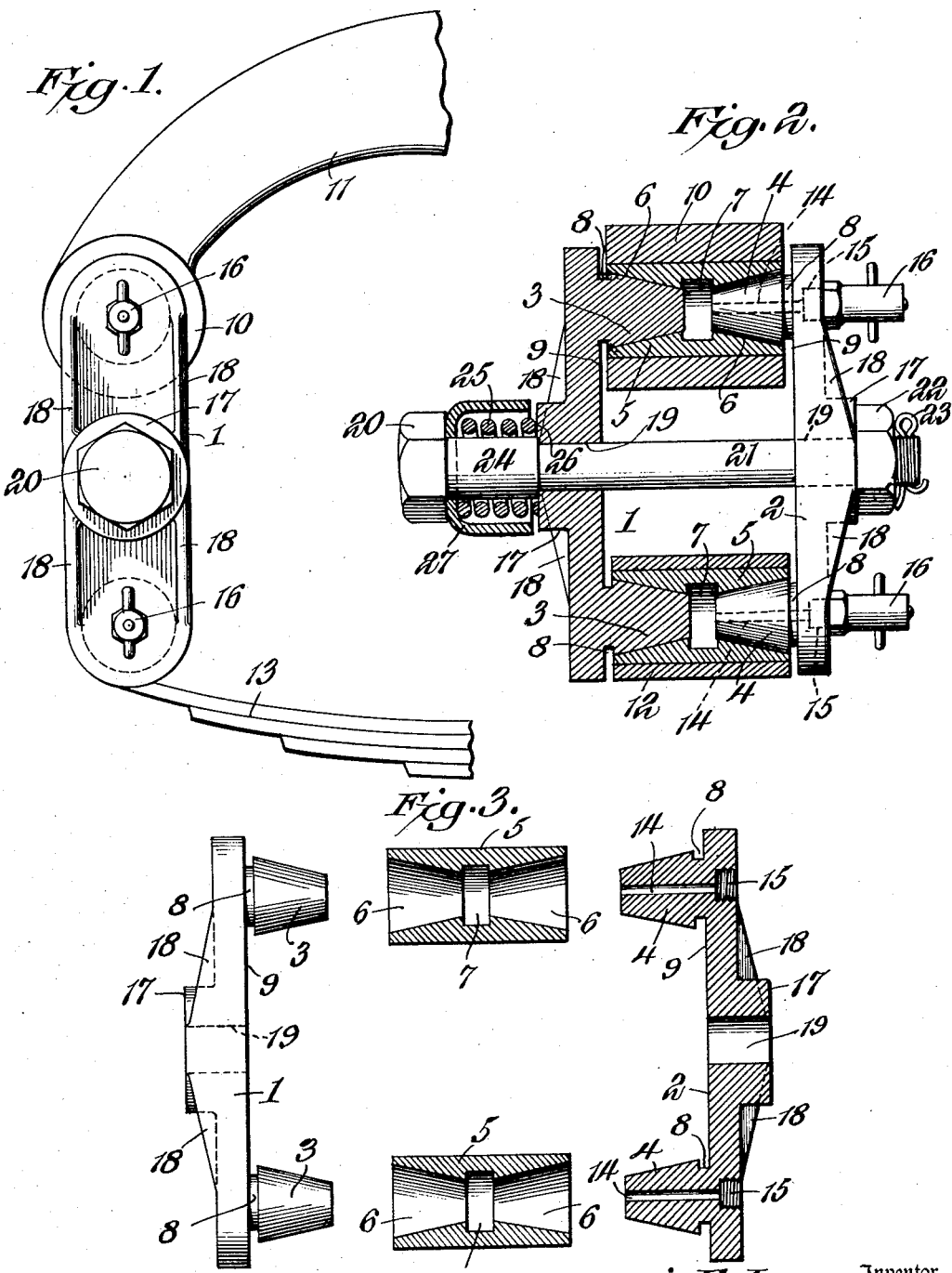
Francis F. James, Inventor Patented Feb. 18, 1930

1,748,048

UNITED STATES PATENT OFFICE

FRANCIS F. JAMES, OF PHILADELPHIA, PENNSYLVANIA

AUTOMATICALLY-ADJUSTABLE DOUBLE-END SHACKLE-BOLT CONNECTION

Application filed October 30, 1928. Serial No. 315,960.

The invention relates to an automatically adjustable double end shackle bolt connection.

The object of the present invention is to improve the construction of shackle bolt connections and to provide a simple, practical and efficient shackle bolt connection which will be strong and durable and adapted to be readily applied to the springs and shackle hangers of automobiles and other motor vehicles, and which will be automatically adjustable to take up the wear.

A further object of the invention is to provide an automatically adjustable shackle bolt connection equipped with opposite cone bearings and provided with grooves arranged at the inner and outer ends of the cone bearings and adapted to prevent the formation of shoulders on the parts of the cone bearing or in the cone bushing which would interfere with the automatic adjustment of the shackle bolt connection until the limit or maximum adjustment has been reached.

With these and other objects in view, the invention consists in the construction and novel combination and arrangement of parts hereinafter fully described, illustrated in the accompanying drawings, and set forth in the claims hereto appended, it being understood that various changes in the form, proportion and minor details of construction, within the scope of the claims, may be resorted to without departing from the spirit of the invention or sacrificing any of the advantages thereof.

In the drawings:

Figure 1 is a side elevation of an automatically adjustable shackle bolt connection constructed in accordance with this invention and illustrating the manner of applying the bolt to the rear ends of the springs.

Fig. 2 is a transverse sectional view of the same.

Fig. 3 is a side elevation, partly in section, illustrating certain parts of the shackle bolt connection in unassembled relation.

In the accompanying drawings, in which is illustrated the preferred embodiment of the invention, the automatically adjustable double end shackle bolt connection comprises in its construction side plates 1 and 2 provided at their ends with inwardly extending cones 3 and 4 which cooperate with cone bearing sleeves 5 having their openings inwardly tapered at opposite sides of the center at 6 and provided wth a central cylindrical groove 7 spacing the tapered bearing portion 6 and providing a central space into which the reduced ends of the cones 3 and 4 are adapted to extend, preventing the formation of shoulders in the bushing at this point, and providing ample space to receive the said cones until the maximum adjustment of the shackle bolt connection has been reached.

The cones 3 and 4 are provided at their enlarged ends with annular grooves 8 which form a reduced connecting portion 9 between the cones and the side plates, and thereby prevent the formation of shoulders at the enlarged ends of the cones. It will thus be seen that the inner or central groove 7 of the cone bearing will prevent the formation of shoulders in the bushing by wear of the small ends of the cones, and the annular grooves 8 at the outer ends of the cones will prevent the formation of shoulders. By this construction the shackle bolt connection will be automatically adjustable until the limit of the adjustment has been reached.

The side plates 1 and 2 are arranged in a vertical position and the bearing sleeves 5, which have cylindrical exteriors, are arranged respectively in the eye 10 of the frame 11 and in the eye 12 of the spring 13. Both the sleeves and the eyes 10 and 12 are of a width less than the space between the side plates, as clearly illustrated in Fig. 2 of the drawings, and the spacing of the side plates from the eyes 10 and 12 and the bearing sleeves 5 provide for an inward adjustment of the cones and the central annular grooves 7 of the bearing sleeves cooperate with the grooves 8 in permitting the adjustment.

The side plate 2 is provided at the upper and lower portions with lubricant passages 14 which extend through the side plates and through the cones 4 and communicate with the central annular grooves 7 of the bearing sleeves for supplying the same with lubricant. The lubricant passages are enlarged at the outer ends and interiorly threaded to provide a threaded socket 15 for the reception of a suitable closure plug 16 and also to enable a grease gun or other means for supplying lubricant to be connected with the lubricant passages.

The side plates are provided with central exterior enlargements 17 and reinforcing ribs or flanges 18 located at opposite sides of the outer face of the side plates.

The enlargements 17 of the side plates are provided with transversely aligned openings 19 extending through the central enlargements to the inner faces of the side plates and receiving a central transverse bolt 20 provided at one end with a head and having its other end portion 21 threaded for the reception of a nut 22; a cotter pin 23, or other suitable locking device, being preferably employed to lock the nut on the bolt. The bolt is provided adjacent to the head 20 with an enlarged portion 24 on which is mounted a coiled spring 25 and which forms a shoulder 26 to bear against the enlargement of the adjacent side plate 1 to limit the spread of the side plates and to prevent the spreading of the shackle beyond the original adjustment. The shoulder forms a positive limit to the expansion of the cones. The coiled spring 25, which is interposed between the head of the bolt and the enlargement of the side plate 1, is adapted to yieldably maintain the cones in contact with the bearing surfaces of the sleeves, and it automatically takes up the wear of the parts and maintains a tight fit between the cones and the sleeves. The coiled spring is preferably covered by a cap 27 consisting of a sleeve open at the inner end and provided at the outer end with an inwardly extending annular flange surrounding and fitting the enlarged portion of the bolt and bearing against the inner face of the head of the bolt and forming a head or button for the outer end of the spring.

The central bolt maintains a firm engagement between the inwardly projecting cones of the side plates and the tapering faces of the sleeves, and the spring automatically tightens the parts and prevents any looseness, noise, or rattling ordinarily incident to wear and consequent looseness of shackle bolt connections.

What is claimed is:

1. An automatically adjustable connection for shackle bolts, including spaced side plates provided at the end portions with inwardly extending cones having annular grooves surrounding the outer ends and forming reduced connecting portions extending from the cones to the side plates, sleeves having cylindrical exteriors and provided with openings tapered inwardly from each end of each sleeve to form bearing surfaces, said sleeves being provided with interior and annular grooves interposed between the tapered bearing surfaces which fit the cones of the side plates, the grooves of the cones being located at the ends of the sleeves and the grooves of the sleeves being located at the terminals of the cones to prevent the formation of shoulders, a transverse bolt connecting the side plates, and a coiled spring disposed on the transverse bolt and maintaining the cones in engagement with the bearing surfaces of the sleeves.

2. An automatically adjustable connection for shackle bolts including side plates provided with inwardly extending cones having annular grooves surrounding the outer ends of the cones and forming reduced connecting portions between the cones and the side plates, one of the said plates being provided with oil passages extending through the said cones to the inner ends of bearing sleeves, said sleeves being exteriorly cylindrical and provided with openings tapered inwardly at opposite sides of the center and provided with central cylindrical grooves spacing the tapered surfaces of the openings of the sleeves and adapted to receive the ends of the cones when the cones become worn and also connecting with said lubricant passages, the grooves of the cones being located at the ends of the sleeves and the grooves of the sleeves being located at the terminals of the cones to prevent the formation of shoulders, a transverse bolt connecting the side plates, and a coiled spring disposed on the transverse bolt and automatically taking up the wear of the cones and the sleeves.

3. An automatically adjustable connection for shackle bolts, including spaced side plates provided at the end portions with inwardly extending cones having annular grooves surrounding the outer ends and forming reduced connecting portions extending from the cones to the side plates, sleeves having cylindrical exteriors and provided with openings tapered inwardly from each end of each sleeve to form bearing surfaces, said sleeves being provided with interior and annular grooves interposed between the tapered bearing surfaces which fit the cones of the side plates, the grooves of the cones being located at the ends of the sleeves and the grooves of the sleeves being located at the terminals of the cones to prevent the formation of shoulders, a transverse bolt having a head at one end and threaded at the other end and enlarged adjacent the head to form a shoulder fitting against one of the side plates to prevent spreading of the same beyond the original adjustment, a nut engaged on the threaded end of the bolt and engaged with the other side plate, a coiled spring disposed on the enlarged portion of the bolt and interposed between the head of the bolt and the side plate.

4. An automatically adjustable connection for shackle bolts, including spaced side plates provided at the end portions with inwardly extending cones having annular grooves surrounding the outer ends and forming reduced connecting portions extending from the cones to the side plates, sleeves having cylindrical exteriors and being provided with openings tapered inwardly from each end of each sleeve to form bearing surfaces, said sleeves being provided with interior and annular grooves interposed between the tapered bearing surfaces which fit the cones of the side plates, the grooves of the cones being located at the ends of the sleeves and the grooves of the sleeves being located at the terminals of the cones to prevent the formation of shoulders, a transverse bolt having a head at one end and threaded at the other end and enlarged adjacent the head to form a shoulder fitting against one of the side plates to prevent spreading of the same beyond the original adjustment, a nut engaged on the threaded end of the bolt and engaged with the other side plate, a coiled spring disposed on the enlarged portion of the bolt and interposed between the head of the bolt and the side plate, and a cap covering the coiled spring and provided at its outer end with a flange fitting the enlarged portion of the bolt.

5. An automatically adjustable connection for shackle bolts including side plates provided at their ends with inwardly extending cones having annular grooves surrounding the outer ends of the cones, one of the side plates being provided with lubricant passages extending to the inner ends of the cones, bearing sleeves designed to be arranged in an eye of a frame and an eye of a spring, and provided with an opening tapered from the ends of the sleeve and having a cylindrical groove at the inner ends of the tapered portions, said tapered portions fitting the cones of the side plates and the lubricant passages communicating with the central grooves of the sleeves, the grooves of the cones being located at the ends of the sleeves and the grooves of the sleeves being located at the terminals of the cones to prevent the formation of shoulders, a central tranverse bolt piercing the side plates and provided at one end with a nut and at the other end with a head and enlarged adjacent the head to form a shoulder which fits against the enlargement of the adjacent side plate to cooperate with the nut to prevent separation of the side plates beyond the original adjustment, and a coiled spring arranged on the enlargement of the bolt and interposed between the head of the said bolt and the adjacent side plate to take up the wear of the cones and the sleeves.

In testimony whereof, I have hereunto affixed my signature this 19th day of September, 1928.

FRANCIS F. JAMES.